United States Patent
Fernando et al.

(10) Patent No.: US 7,992,132 B2
(45) Date of Patent: Aug. 2, 2011

(54) SERVER SIDE APPLICATION INTEGRATION FRAMEWORK

(75) Inventors: Dushan Fernando, Friendswood, TX (US); Anthony Candappa, Friendswood, TX (US); Koustubh Pawar, Pune Maharashtra (IN); Nitin Maheshwari, Hyderabad (IN)

(73) Assignee: Computer Associates Think, Inc., Islandia, NY (US)

( * ) Notice: Subject to any disclaimer, the term of this patent is extended or adjusted under 35 U.S.C. 154(b) by 1202 days.

(21) Appl. No.: 11/559,234

(22) Filed: Nov. 13, 2006

(65) Prior Publication Data

US 2008/0222617 A1    Sep. 11, 2008

Related U.S. Application Data

(60) Provisional application No. 60/735,175, filed on Nov. 10, 2005.

(51) Int. Cl.
  *G06F 9/44*   (2006.01)
  *G06F 9/45*   (2006.01)
(52) U.S. Cl. .......................... 717/120; 717/104; 717/136
(58) Field of Classification Search .................. None
   See application file for complete search history.

(56) References Cited

U.S. PATENT DOCUMENTS

| | | | |
|---|---|---|---|
| 7,676,786 B2 * | 3/2010 | Shenfield et al. | 717/104 |
| 2003/0212987 A1 | 11/2003 | Demuth et al. | 717/130 |
| 2004/0226027 A1 | 11/2004 | Winter | 719/328 |
| 2005/0050068 A1 * | 3/2005 | Vaschillo et al. | 707/100 |
| 2005/0159828 A1 * | 7/2005 | Deininger et al. | 700/87 |
| 2005/0203960 A1 * | 9/2005 | Suarez et al. | 707/200 |
| 2007/0033570 A1 * | 2/2007 | Kong | 717/104 |
| 2008/0022264 A1 * | 1/2008 | Macklem et al. | 717/136 |
| 2008/0276221 A1 * | 11/2008 | Lev et al. | 717/120 |
| 2009/0113389 A1 * | 4/2009 | Ergo et al. | 717/120 |

OTHER PUBLICATIONS

"Server-side scripting using active server pages and VBScript", Haney et al., Dec. 2000, pp. 167-173, <http://delivery.acm.org/10.1145/360000/357727/p167-haney.pdf>.*
"A framework for the server-side management of conversations with web services", Ardissono et al., May 2004, pp. 124-133, <http://delivery.acm.org/10.1145/1020000/1013389/p124-ardissono.pdf>.*
"Server-side encoding, protocol and transport extensibility for remoting systems", H. Carr, Nov. 2004, pp. 329-334, <http://delivery.acm.org/10.1145/1040000/1035215/p329-crr.pdf>.*

* cited by examiner

*Primary Examiner* — Thuy Dao
(74) *Attorney, Agent, or Firm* — Pillsbury Winthrop Shaw Pittman LLP

(57) ABSTRACT

A flexible, platform-independent integration infrastructure is provided. The integration infrastructure may include an integration bridge and at least one plug-in, where the at least one plug-in may include translation rules, mapping rules, and other information associated with a component coupled to the plug-in. The translation rules, mapping rules, and other information may be used by the integration bridge during a mapping process to control communication between components. Based on the rules and information, a mapping translator of the integration bridge converts data received from component into a form readable by another component.

33 Claims, 10 Drawing Sheets

is inline

SERVER SIDE APPLICATION INTEGRATION FRAMEWORK

CROSS-REFERENCE TO RELATED APPLICATIONS

This application claims the benefit of U.S. Provisional Patent Application Ser. No. 60/735,175, entitled "Generic Server Side Application Integration Framework," filed Nov. 10, 2005, the contents of which are hereby incorporated by reference in their entirety.

FIELD OF THE INVENTION

The present invention relates to a systems integration framework, and in particular, to a server-side application integration framework.

BACKGROUND OF THE INVENTION

Systems and software integration often involves many challenges, particularly when new components are integrated with existing infrastructures or legacy systems. For example, integration requires consideration of, among other things, changes to code, documentation, infrastructure, and design specifications on an enterprise-wide basis. However, existing systems for managing integration processes are unable to cohesively manage changes to organizational and information technology infrastructures. This may result in production failures, system downtime, business discontinuity, regulatory incompliance, or other problems.

Thus, a critical aspect of designing a successful integration system is identifying common features and functions of the integration process, which would provide an efficient solution for rapidly introducing changes to information technology infrastructures without compromising ongoing service quality. However, existing systems are unable to provide an integration framework that effectively coordinates interrelated activities, while increasing efficiencies and lowering risk. Moreover, existing systems require recompilation when a new component is introduced to an infrastructure, thereby decreasing efficiency, introducing downtime, and causing other problems.

Existing systems suffer from these and other problems.

SUMMARY OF THE INVENTION

According to various aspects and implementations of the invention, a flexible, platform-independent integration architecture may address the drawbacks of existing systems. The integration architecture may account for common features and functionality needed when integrating new components. For example, integration may often involve moving data to and from an integration system, or may often execute on a server-side, or other common features and functions may be identified, thereby substantially reducing an amount of time needed to integrate a component, while eliminating a need to recompile, restart, or reboot the integration architecture after the component has been integrated.

According to some aspects of the invention, an integration architecture may include an integration bridge having a common object model and standardized interfaces. The common object model and standardized interfaces may be used, for example, to facilitate communication among various system components. For example, a notification, message, or other information may be received from a first component, and the integration architecture may use the common object model to interpret the information. The interpreted information may then be translated using an object model associated a second component, and the translated information may be relayed to the second component. Thus, the integration architecture may be generic, and may be used to integrate many different types of components, in a flexible, platform-independent manner.

According to some aspects of the invention, the integration architecture may include at least one plug-in for a component being integrated, where the plug-in may provide an interface between the component being integrated and the integration bridge. For example, the plug-in may identify translation rules, mapping rules, or other information for facilitating communication between the component being integrated and the integration bridge. The translation rules, mapping rules, or other information may be contained within a configuration mechanism (e.g., an Extensible Markup Language (XML) file), which may define a data model for translating data as it passes to or from the component being integrated. Moreover, the plug-in may interface with the integration bridge, or other system components, to retrieve additional information for modeling the component being integrated. Thus, a new component may be easily integrated using a plug-in designed according to various aspects of the invention.

According to some aspects of the invention, the plug-in may include at least one interface for communicating with a component being integrated into a system, and at least one interface for communicating with an integration bridge that integrates the component into the system. The at least one interface for communicating with the integration bridge may include one or more modules for interpreting data received from the component, and one or more modules for communicating the interpreted data to the integration bridge in a form that the integration bridge can understand. The plug-in may include one or more models of the component, and the plug-in may provide the models to existing and/or later-integrated components within the system. In some implementations, the integration architecture may include a graphical user interface that allows an administrator or other end user to input customized translation rules, mapping rules, or other rules for one or more plug-ins.

According to some aspects of the invention, the integration architecture may include a synchronization module to synchronize data between two or more plug-ins based on predefined rules. The synchronization module may be used to synchronize data when a component fails or crashes, a severed connection is restored, or in any other instance when data between two or more plug-ins is unsynchronized. The synchronization module may send a pulse to at least one plug-in, and the at least one plug-in may reply to the pulse (e.g., based on a connection status for a corresponding component). The synchronization module may communicate a request to the integration bridge when the reply indicates data is unsynchronized, and an action may be taken to synchronize data as appropriate. For example, the integration bridge may place the request in a queue, and the request may be processed based on one or more predefined rules.

Other objects and advantages of the invention will be apparent to those skilled in the art based on the following drawings and detailed description.

DETAILED DESCRIPTION

Figure 1:
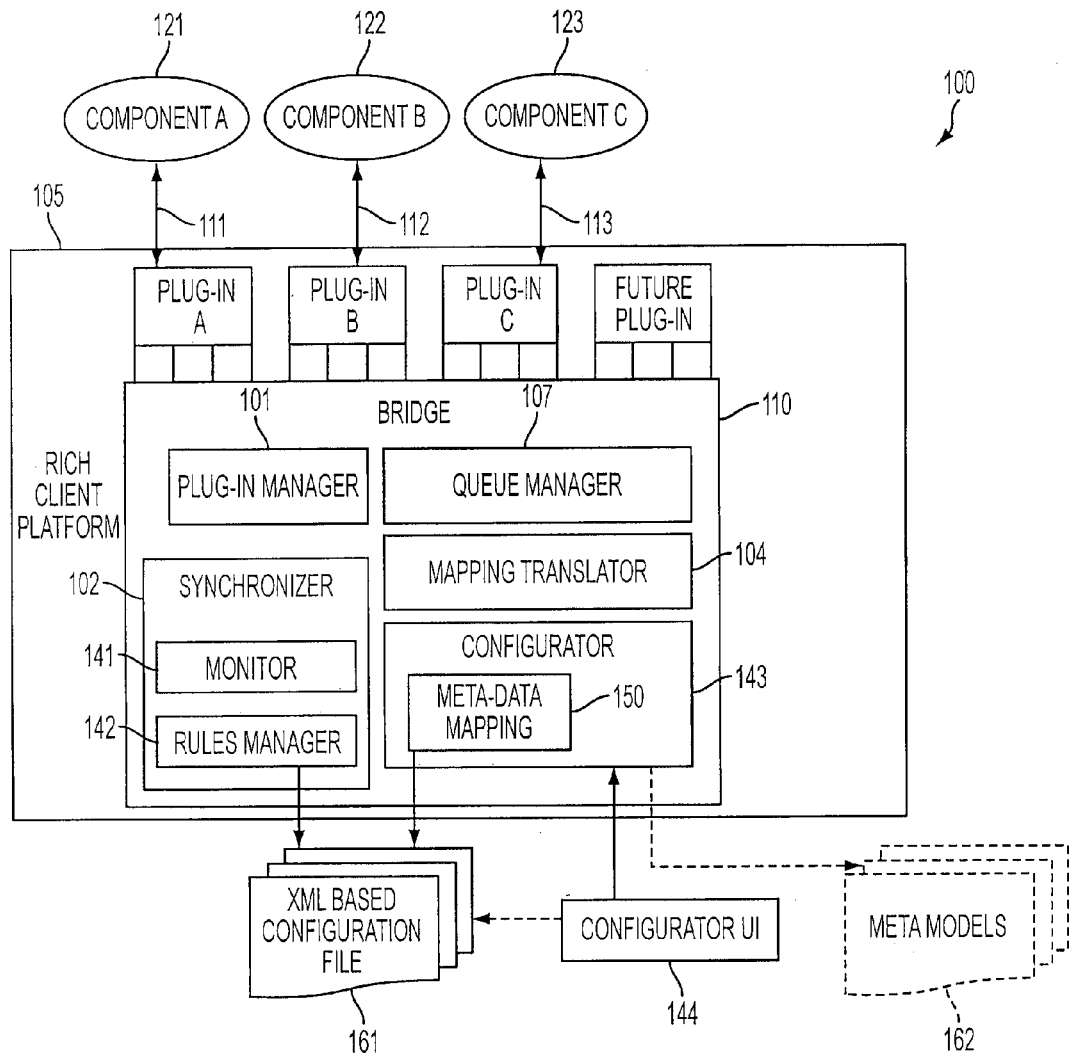
FIG. 1 illustrates a block diagram of an exemplary integration architecture according to various aspects of the invention.

Referring to FIG. 1, an exemplary integration architecture 100 is provided according to various aspects of the invention. Integration architecture 100 may be flexible and platform-independent, addressing the drawbacks of existing systems by accounting for common features and functionality needed to integrate new components. For example, integration may often involve moving data to and from an integration system, or may often execute on a server-side, or other common features and functions may be identified. Thus, integration architecture 100 may include one or more Plug-ins (e.g., Plug-in A 111, Plug-in B 112, Plug-in C 113, etc.) interfacing between Components being integrated (e.g., Component A 121, Component B 122, Component C 123, etc.) and an Integration Bridge 110. Plug-ins 111-113 may include translation rules, mapping rules, meta models, object models, interfaces, and other information for facilitating communication between Components 121-123 and Integration Bridge 110. The translation rules, mapping rules, meta models, object models, or other information may be contained within a configuration mechanism (e.g., an Extensible Markup Language (XML) based configuration file 161), which may include a model for translating data as it passes to or from Components 121-123. Moreover, Plug-ins 111-113 may interface with Integration Bridge 110, or other system components, to retrieve information for modeling Components 121-123. Thus, integration architecture 100 may account for issues of data translation in a way that substantially reduces integration time, while eliminating a need to recompile, restart, or reboot integration architecture 100 after integration.

According to some aspects of the invention, Integration bridge 110 may include, among other things, a Plug-in manager 101, a Synchronizer 102 having a Monitor 131 and a Rules Manager 142, a Queue Manager 107, a Mapping Translator 104, and a Configurator 143 having a Meta-Data Mapping 150. In some implementations, Integration Bridge 110 may be embodied on a Rich Client Platform 105, which may be any suitable platform based on a dynamic plug-in architecture model. This allows Plug-ins 111-113 to be built using toolkits and extension points that may be common to those used in Rich Client Platform 105. Thus, integration architecture 100 may be generic, and may be used to integrate many different types of components, in a flexible, platform-independent manner. Moreover, development time may be reduced by leveraging well-received, platform-independent technologies to manage a plug-in framework for integration bridge 110. For example, in some implementations, Rich Client Platform 105 may be the Eclipse Rich Client Platform, which provides a component framework that requires a minimal set of plug-ins to build client applications. In some implementations, Integration Bridge 110 may be designed as a Windows service, a Unix daemon, or another suitable service that can be employed on various types of machines. However, those skilled in the art will appreciate that other suitable platforms may be used for Rich Client Platform 105 and/or Integration Bridge 110 without departing from the scope of the invention.

In some embodiments, Integration Bridge 110 may include a Plug-in manager 101 for managing communication with Plug-ins 111-113. Thus, Integration Bridge 110 may interface with an unlimited number of Components 121-123 via corresponding Plug-ins 111-113, where the interfaces may be managed by Plug-in manager 101. Integration Bridge 110 may include common object models and standard interfaces, and each Plug-in 111-113 may implement at least the common object models and standard interfaces. For example, a notification, message, or other data may be received from Component A 121, where the notification, message, or other data may be directed to Component B 122. Integration bridge 110 may translate the notification, message, or other data using an object model of Plug-in A 111, and may subsequently translate the notification, message, or other information using an object model of Plug-in B 112. Therefore, Components 121-123, which may have different requirements, object models, or other characteristics, may communicate with each other via common object models and standard interfaces, as implemented by Plug-ins 111-113 and Integration Bridge 110.

According to some aspects of the invention, Components 121-123 may be integrated into architecture 100 without needing to restart, reboot, or recompile Integration Bridge 110 or any other active component. For example, each Plug-in 111-113 may include one or more XML-based configuration files 161 that supply default mapping rules and translation rules for mapping data received from, or directed to, corresponding Components 121-123. XML-based configuration files 161 may be referred to Mapping Translator 104 during a mapping process, and may also provide necessary information for Configurator 143 and/or Synchronizer 102. Moreover, each Plug-in 111-113 may include one or more Meta Models 162, which may include meta-information for corresponding Components 121-123. Thus, Integration Bridge 110 need not be restarted to load Plug-ins 111-113, as new Plug-ins 111-113 may be loaded and bootstrapped onto a running system using through Configurator 143. Furthermore, an administrator or other end user may edit or create custom mapping rules through a Configurator User Interface 144, thereby adding flexibility to integration architecture 100.

Figure 2:
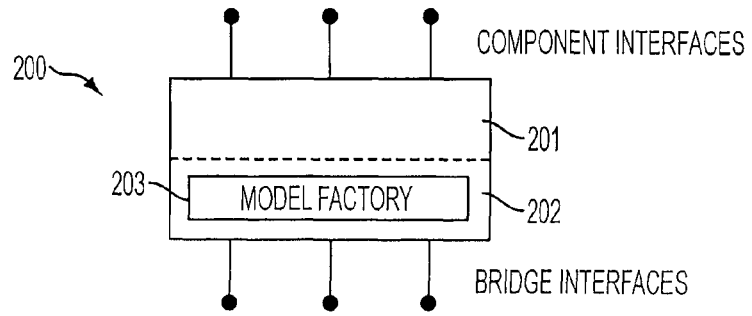
FIG. 2 illustrates a block diagram of an exemplary plug-in for interfacing between a component and an integration bridge according to various aspects of the invention.

Referring to FIG. 2, an exemplary Plug-in 200 for interfacing between a Component and the Integration Bridge is provided according to various aspects of the invention. Plug-in 200 may be responsible for handling bi-directional communications with a corresponding Component. For example, when a new Component is initially set up, Plug-in 200 may provide default translation rules, mapping rules, and other information, which may be captured in a corresponding configuration file (e.g., an XML based configuration file). Plug-in 200 may also include interfaces for the Integration Bridge, Configurator, Synchronizer, or other system components to retrieve modeling information, synchronize communication, or otherwise communicate with the Component. That is, while active, Plug-in 200 may translate information received from the Component according to a data model that can be understood by the Integration Bridge, Configurator, Synchronizer, or another system component. Moreover, Plug-in 200 may translate information received from the Integration Bridge, Configuration, Synchronizer, or another system component according to a data model that can be understood by the Component.

According to various aspects of the invention, Plug-in 200 may include a Component module 201. Component module 201 may communicate with a Component being integrated. In some implementations, Component module 201 may communicate with a server (e.g., a Change Management server) via an exposed web service. Because requirements may vary from one Component to another, Component module 201 need not expose any common interfaces. Component module 201 may include a mechanism for receiving notifications, messages, or other information from a Component. For example, notifications, messages, or other information may be received using a message listener or a similar application program interface that supports messages between computing devices. In some implementations, the message listener may be implemented using Java Messaging Service, although those skilled in the art will appreciate that any suitable service may be used.

According to various aspects of the invention, Plug-in 200 may include a Bridge module 202. Bridge module 202 may interpret data received from Component module 201, and may convert the received data into an object model that can be passed to the Integration Bridge. A Model Factory 203 may create at least one object instance for the converted object model. Bridge module 202 may also implement any interfaces needed to communicate with the Integration Bridge.

According to various aspects of the invention, Plug-in 200 may be managed and/or configured using any suitable combination of the Configurator and Configurator User Interface (e.g., an administration utility or configuration utility). The Configurator may manage Meta Models provided by a Component. The Configurator may manage project level bindings from one Component to another, as well as managing mappings between Components. The mappings, together with the Meta Models, may be used to translate information from one Component to another (e.g., via the Mapping Translator). For example, a request issued by a first Component may be received by Plug-in 200 and provided to the Configurator. The Configurator may provide the request to the Mapping Translator, which consumes the request and generates a translated request. The translated request may then be relayed to a second Component. In some implementations, the Configurator may itself be a Plug-in to the integration architecture of the invention.

In some implementations, the Configurator may be managed via the Configurator User Interface. Moreover, the Meta Models may be loaded into the Configurator via the Configurator User Interface. The Configurator User Interface may be displayed via a display device, and may provide functions and features for defining Plug-in 200 and/or tying Plug-in 200 to the Integration Bridge. For example, during an initial set-up of a new Plug-in 200, the Configurator may receive a Meta Model and a Mapping file from the new Plug-in 200 via the Configurator User Interface. Moreover, the Configurator User Interface may be used to define custom mappings between two or more Plug-ins 200. For example, when a default mapping is unavailable, the Configurator User Interface may be used to create a mapping from one Plug-in 200 to another Plug-in 200.

Figure 3:
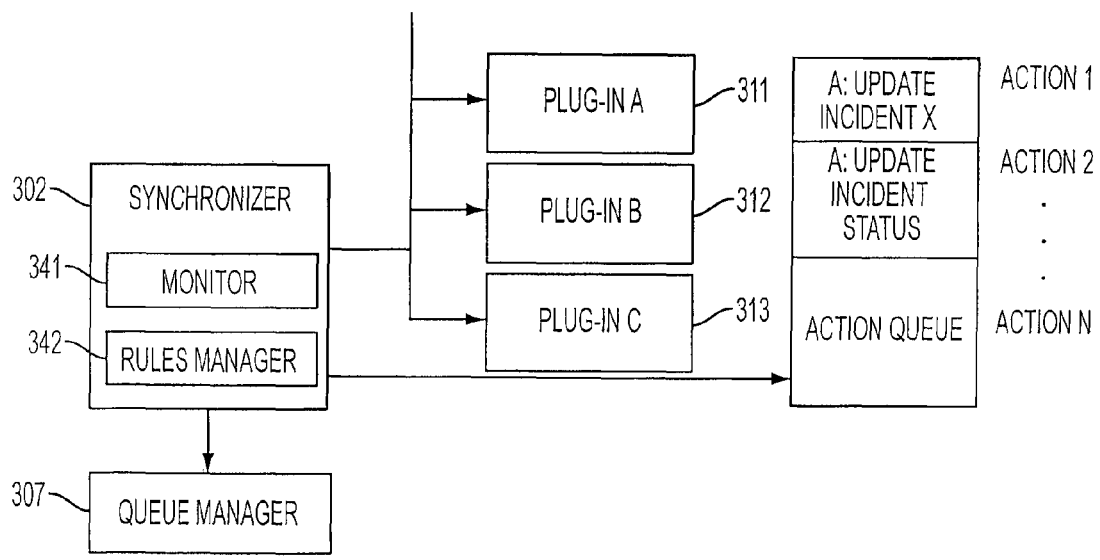
FIG. 3 illustrates a block diagram of an exemplary synchronizer for synchronizing data among plug-ins according to various aspects of the invention.

Referring to FIG. 3, an exemplary Synchronizer 302 may synchronize data among Plug-ins 311-313 according to various aspects of the invention. Synchronizer 302 may be used to synchronize data when Components fail or crash, after a severed connection with a Component is restored, or in any other instance when data among Plug-ins 311-313 becomes unsynchronized. Synchronizer 302 may manage synchronization among Plug-ins 311-313 using, among other things, a Monitor 341 and a Rules Manager 342. For example, Monitor 341 may assist in monitoring and/or synchronizing data among Plug-ins 311-313 by sending a pulse to one or more of Plug-ins 311-313 to determine a status of Plug-ins 311-313, and Plug-ins 311-313 may provide a response to the pulse (e.g., based on a connection status for a corresponding component).

Synchronizer 302 may analyze the response based on one or more predefined rules stored in Rule Manager 342. In some implementations, the predefined rules may be defined according to an XML based configuration file associated with a Component associated with the responding Plug-in. In some implementations, the predefined rules may be authored using the Configurator. When Rules Manager 342 indicates that the response satisfies a predetermined condition (e.g., an unsynchronized state), Synchronizer 302 may instruct the Integration Bridge to delegate action to take appropriate action. For example, Synchronizer 302 may instruct the Integration Bridge to queue an appropriate action according to the response (e.g., via a Queue Manager 307). Queue Manager 307 may periodically poll, iterate, or otherwise retrieve queued actions. For example, Queue Manager 307 may retrieve an action from a queue and determine whether a Plug-in associated with an action is active, and when the Plug-in is active, the action may be sent for processing. In some implementations, an action may be moved to an end of the queue when the Plug-in is inactive. However, those skilled in the art will appreciate that mechanisms for processing work in the queue may be varied according to various rules, and that any suitable queuing/processing mechanism may be suitably substituted without departing from the scope of the invention.

Figure 4:
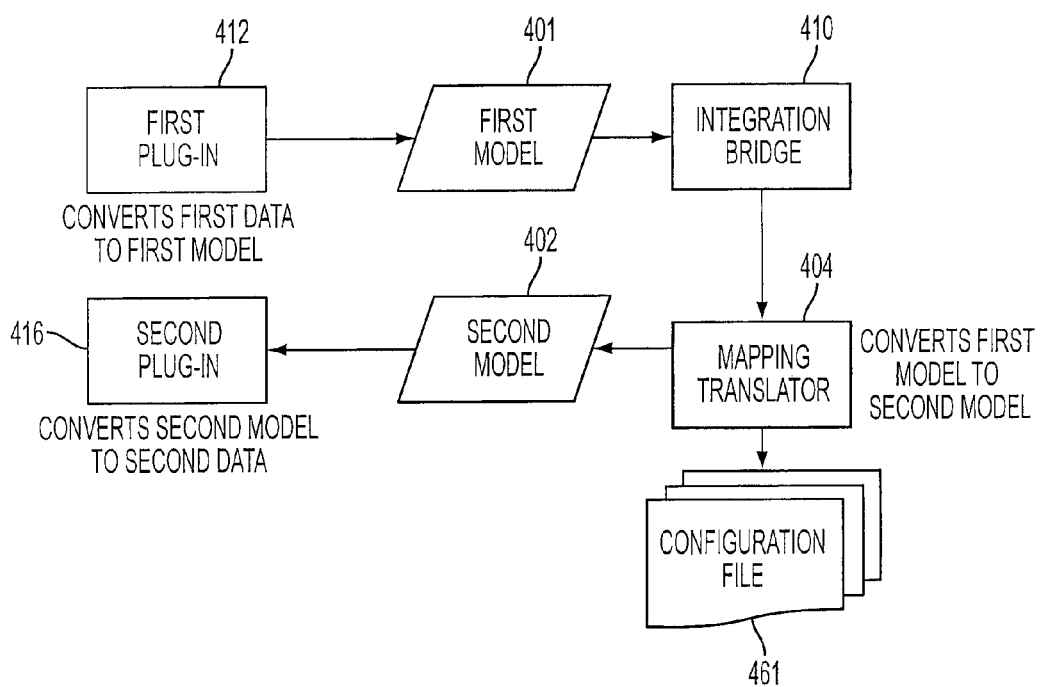
FIG. 4 illustrates a flow diagram of an exemplary mapping translation process according to various aspects of the invention.

Referring to FIG. 4, an exemplary mapping translation process is provided according to various aspects of the invention. A Mapping Translator 404 may translate objects using Meta Data Mappings and Meta Models associated with various Components and their associated Plug-ins. For example, in some implementations, object mappings may be predefined and stored in a default mapping file for use by Mapping Translator 404. However, in some implementations, all objects may not necessarily have a default mapping. As described above, custom mappings may optionally be provided (e.g., via the Configurator User Interface).

FIG. 4 illustrates an exemplary process for converting data between two or more Components (via corresponding Plug-ins). In operation, data may be received from a first Component, where a First Plug-in 412 associated with the first Component may convert the data to a first Meta Model 401. That is, First Plug-in 412 may convert data from a first Component into a First Meta Model 401 that can be understood by an Integration Bridge 410. First Meta Model 401 may be provided to Integration Bridge 410, and Integration Bridge 410 may forward First Meta Model 401 to Mapping Translator 404. Mapping Translator 404 may consult one or more Configuration Files 461, which may provide rules, mapping information, and other information about the Plug-ins. Thus, Mapping Translator 404 may use the information in Configuration Files 461 to convert First Meta Model 401 to a Second Meta Model 402. Second Meta Model 402 may then be provided to a Second Plug-in 416, which converts Second Meta Model 402 into data usable by a second Component. Thus, Plug-ins may be isolated from each other, while maintaining communicative capabilities in a generic and platform-independent architecture.

Figure 5A:
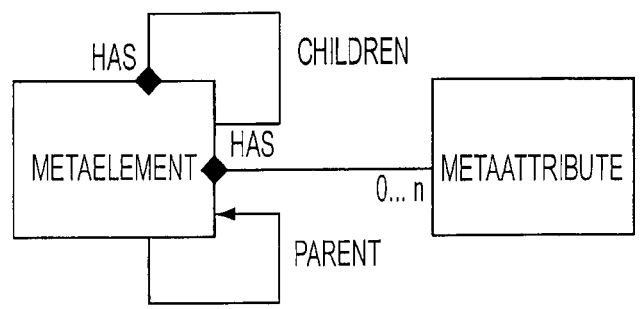
FIGS. 5a-c illustrate exemplary meta models according to various aspects of the invention.
Figure 5B:
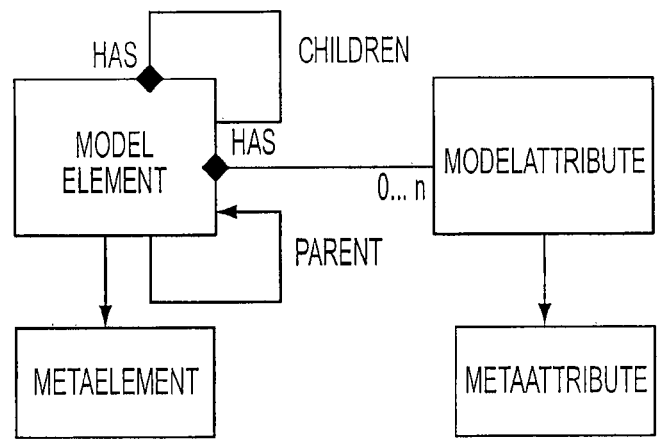
Figure 5C:
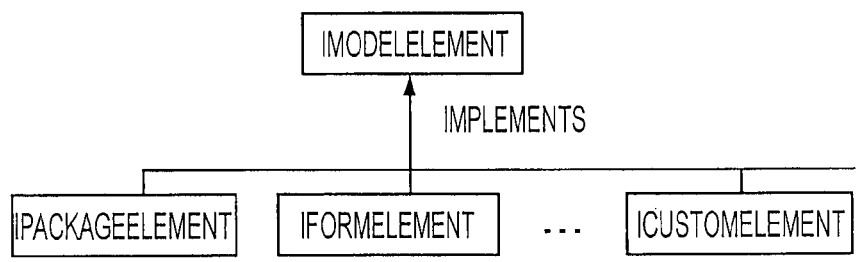

Referring to FIGS. 5a-c, exemplary Meta Models are provided according to various aspects of the invention. FIGS.

5a-c illustrate data flows of a mapping translation process, using the Mapping Translator, for translating a data model received from a first Component to a data model understandable by a second Component. After the mapping translation process, the translated data model is used for communication between the first and second Component. Those skilled in the art will appreciate that communications between any two Components can be also achieved in similar ways.

Initially configuring a newly integrated Component may include providing a configuration file (e.g., an XML-based configuration file) via a corresponding Plug-in. The configuration file may describe a static aspect of a Meta Model for the Component. The Configurator may load the configuration file into the Integration Bridge. FIG. 5a illustrates a class diagram for describing such a static Meta Model. Using the exemplary generic Meta Model class diagram shown in FIG. 5a, any Plug-in may communicate with any other Plug-in. That is, each Plug-in may implement a Model Factory (see FIG. 2) in accordance with the Meta Model of FIG. 5a, which may facilitate creating object instances described by a native application domain for the Plug-in.

FIG. 5b illustrates an exemplary class diagram for a Mapping Model provided by a Plug-in. When two or more Plug-ins intend to communicate with each other, each Plug-in may configure a Mapping Model for communication between the Plug-ins. The Mapping Model may subsequently be used by the Integration Bridge to accommodate communications between the Plug-ins. FIG. 5b shows how a ModelElement and a ModelAttribute may be used to facilitate communicate between various Plug-ins, between internal components, or various combinations thereof. A Plug-in may include one or more interfaces, which may implement object instances to be used as adapters when communicating with the Integration Bridge. Thus, the interfaces may be adapted in various ways, such that any Plug-in may include a domain object model that can be communicated to other Components via the Integration Bridge, thereby providing system-wide model transparency.

For example, FIG. 5c illustrates an exemplary domain interface model implementing the class diagrams shown in FIGS. 5a-b. In an exemplary implementation, a Plug-in may include a native application domain having package objects, form objects, custom objects, or other objects. Thus, the Plug-in may implement ModelElements (according to FIGS. 5a-b) for an IPackageElement, an IformElement, an ICustomElement, or other elements, each of which may implement back-end logic necessary to handle corresponding objects instances in the native application domain. Other Plug-ins may likewise implement interfaces for supported meta types, thereby facilitating communication between different types of Components via a common object model.

Referring to FIGS. 6a-h, exemplary integration scenarios are provided according to various aspects of the invention. Various integrations may show how Projects (e.g., an aspect of a Component) implemented and/or controlled by corresponding Plug-ins, may be integrated by configuring scopes, or mappings, to other Projects implemented and/or controlled by other Plug-ins.

Figure 6A:
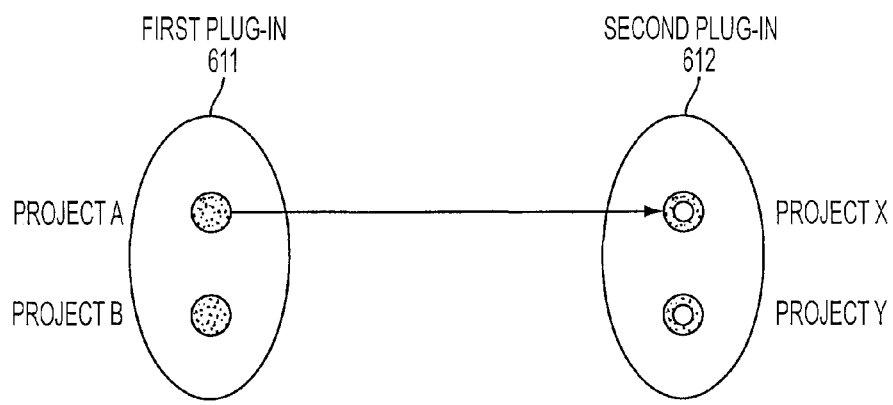
FIGS. 6a-h illustrate exemplary integration scenarios according to various aspects of the invention.

In one example, FIG. 6a may illustrate an integration scenario where a Project A implemented by a First Plug-in 611 may be mapped to a Project X implemented by a Second Plug-in 612. The scenario shown in FIG. 6a demonstrates a simple integration, where First Plug-in 611 and Second Plug-in 612 each implement a mapping as necessary for communication between Projects A and X.

Figure 6B:
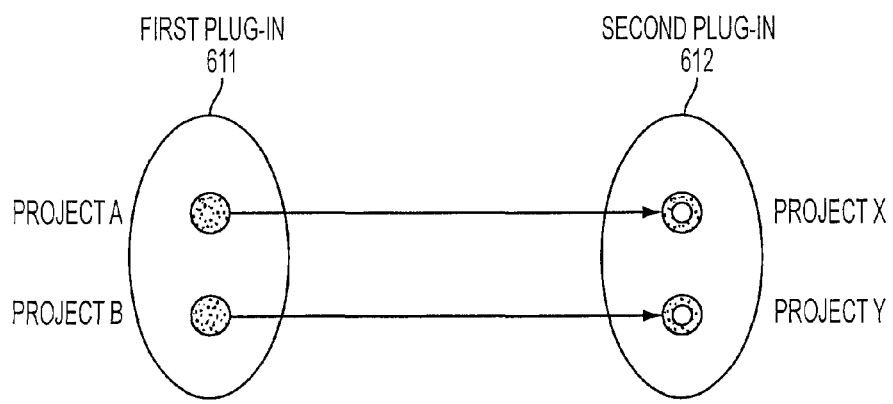

In another example, FIG. 6b may illustrate an integration scenario similar to the scenario shown in FIG. 6a. That is, in addition to mapping Project A to Project X, First Plug-in 611 may also implement a mapping configuration as necessary for communication between a Project B implemented by First Plug-in 611 to a Project Y implemented by Second Plug-in 612. That is, Projects A and B of First Plug-in 611 may be mapped to Projects X and Y of Second Plug-in 612, respectively.

Figure 6C:
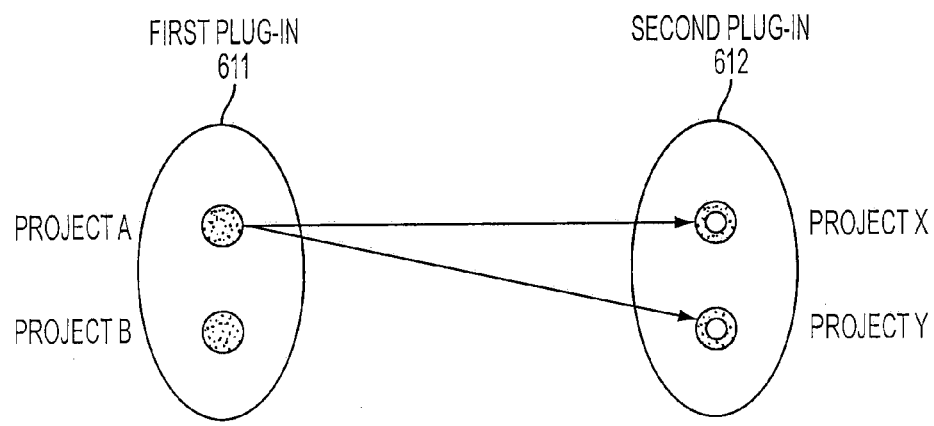

In another example, FIG. 6c may illustrate an integration scenario where Project A implemented by First Plug-in 611 may be mapped to Projects X and Y of Second Plug-in 612. In this configuration, Project A may implement features and functions to distinguish a destination of a communicated object. That is, First Plug-in 611 may prevent objects from being created and tracked on both Project X and Y, and thus introducing unnecessary redundancy, by distinguishing where corresponding data should go (e.g., via a drop-down menu).

Figure 6D:
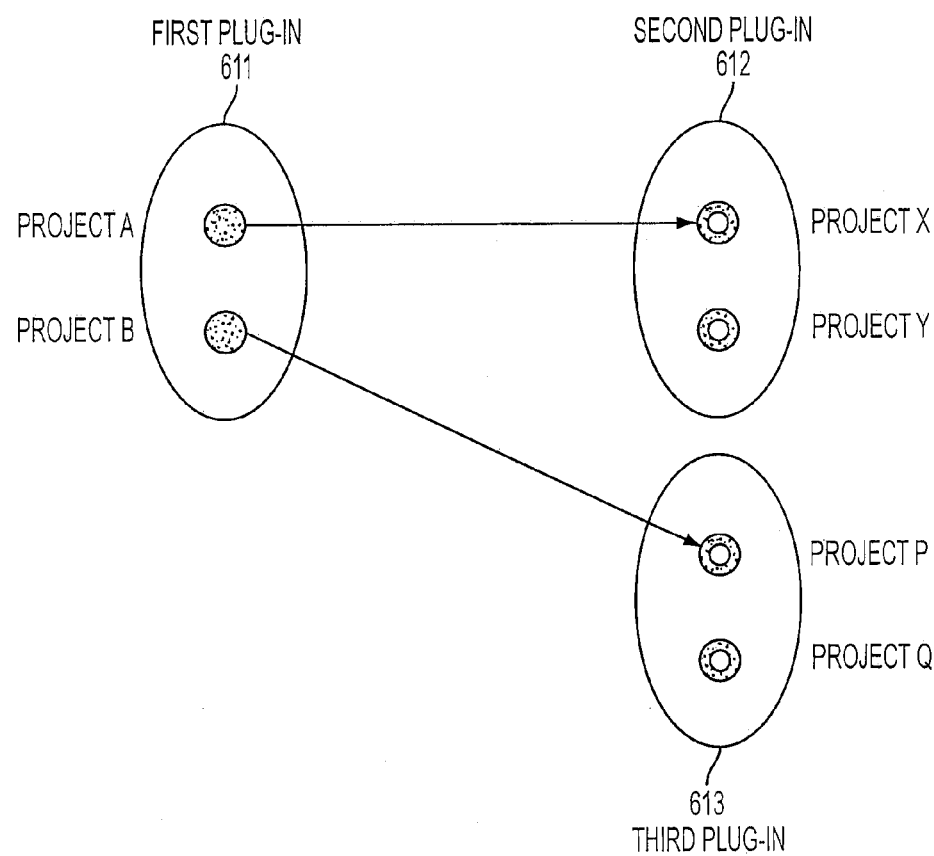

In another example, FIG. 6d may illustrate an integration scenario where First Plug-in 611 may include two or more Projects that integrate with Projects in two or more other Plug-ins (e.g., Second Plug-in 612 and a Third Plug-in 613). In this example, Project A of First Plug-in 611 may integrate with, or map to, Project X of Second Plug-in 612, while Project B of First Plug-in 611 may integrate with, or map to, a Project P of Third Plug-in 613. In such cases, the Integration Bridge may configure the integration as two instances of the scenario shown in FIG. 6a.

Figure 6E:
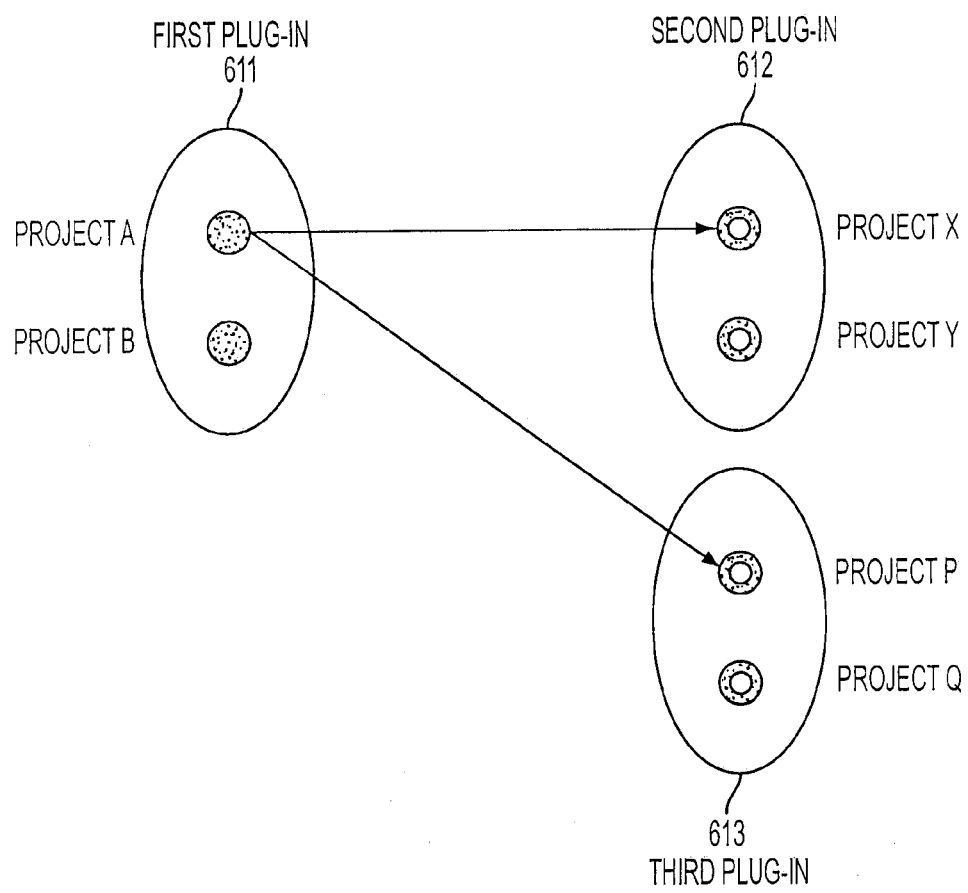

In another example, FIG. 6e may illustrate an integration scenario that combines the scenarios shown in FIGS. 6c-d. That is, Project A of First Plug-in 611 may map to two distinct Projects (e.g., Project X of Second Plug-in 612 and Project P of Second Plug-in 612), as shown in FIG. 6c. Moreover, Projects of First Plug-in 611 may to Projects of two or more other Plug-ins (e.g., Second Plug-in 612 and Third Plug-in 613). In some implementation, this scenario may be implemented by having First Plug-in 612 distinguish a destination of a communicated object (e.g., by a drop-down menu indicating a combination of a destination server and Project). In some implementations, this scenario may be implemented by having Second Plug-in 12 and Third Plug-in 613 each expect duplicate messages. For example, when duplicate messages are expected, a first configuration may map Project A to Project X, while a second configuration may map Project A to Project P.

Figure 6F:
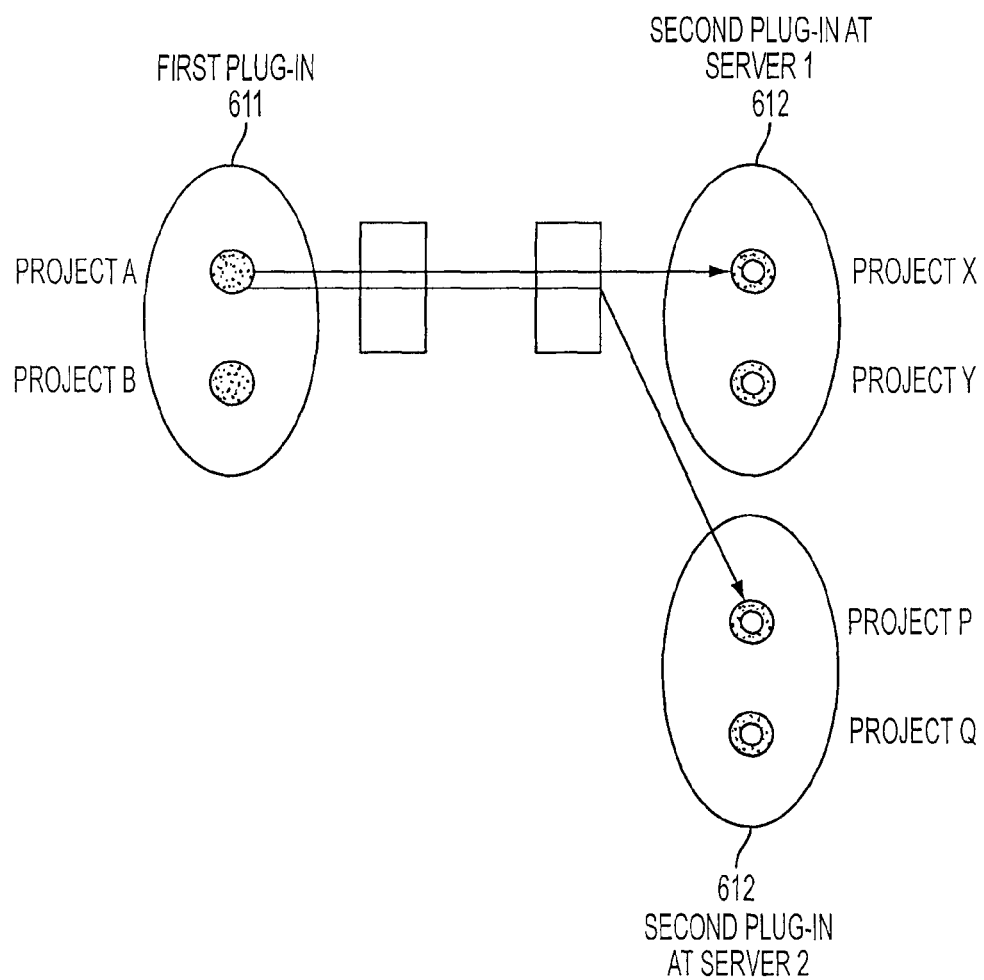

In another example, FIG. 6f may illustrate an integration scenario where Project A of First Plug-in 611 maps to Projects residing on different servers, but implemented by a same Plug-in. For example, as illustrated, Second Plug-in 612 may implement Projects X, Y, P, and Q, but Projects X and Y may reside on Server 1, while Projects P and Q may reside on Server 2. In some implementations, a first Integration Bridge may be used to configure a mapping between Project A and Project X, while a second Integration Bridge may be used to configure a mapping between Project A and Project P. In some implementations, a Rich Client Platform may support multiple instances of a Plug-in, and a single Integration Bridge may be used to configure mappings between Project A and Projects X and P, where Projects X and P are implemented by a same Plug-in, but reside on different servers. That is, a single Integration Bridge may be used when a Plug-in simultaneously supports configurations of more than one server.

Figure 6G:
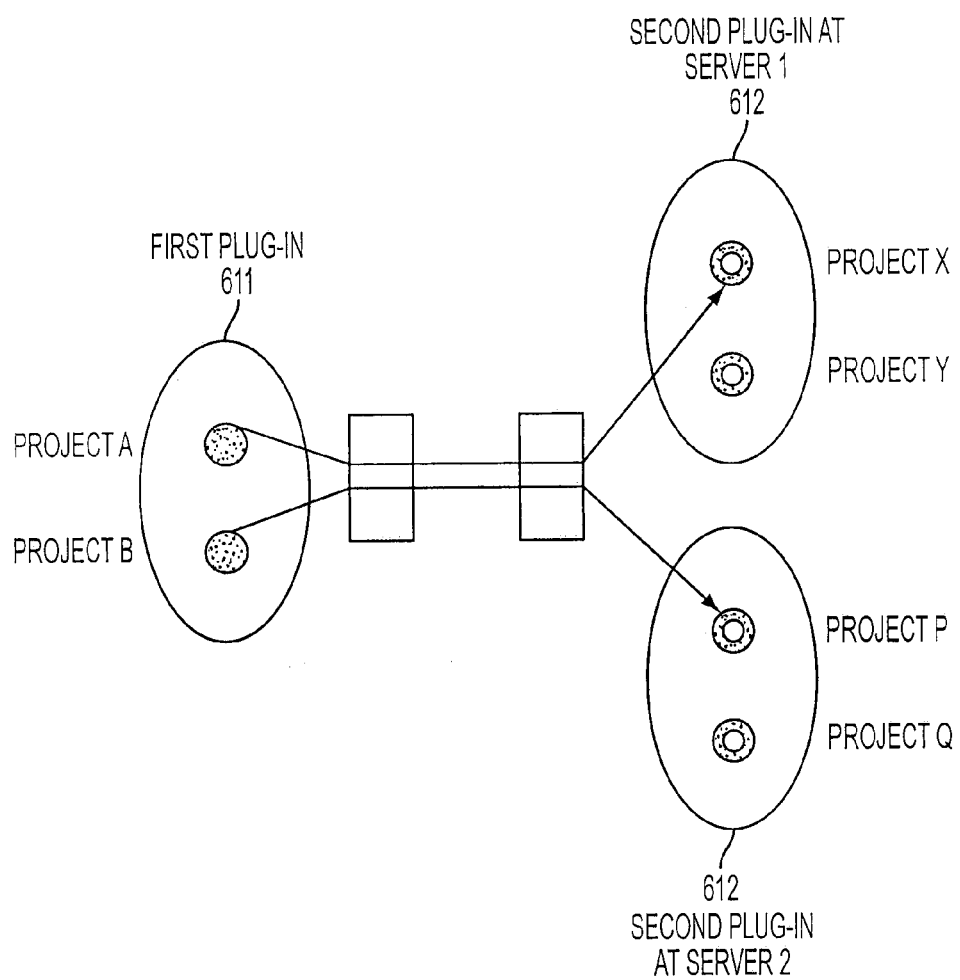

In another example, FIG. 6g may illustrate a similar integration scenario as shown in FIG. 6f. In some implementations, a first Integration Bridge may be used to configure a mapping between Project A of First Plug-in 611 and Project X of Second Plug-in 612, which may reside on a Server 1. A second Integration Bridge may be used to configure a mapping between Project B of First Plug-in 611 and Project P of Second Plug-in 612, which may reside on a Server 2. Similarly, in some implementations, a Rich Client Platform may support multiple instances of a Plug-in, and a single Integration Bridge may be used to configure mappings between Projects A and B of First Plug-in 611 and Projects X and P of Second Plug-in 612, respectively. That is, a single Integration Bridge may be used when a Plug-in simultaneously supports configurations of more than one server.

Figure 6H:
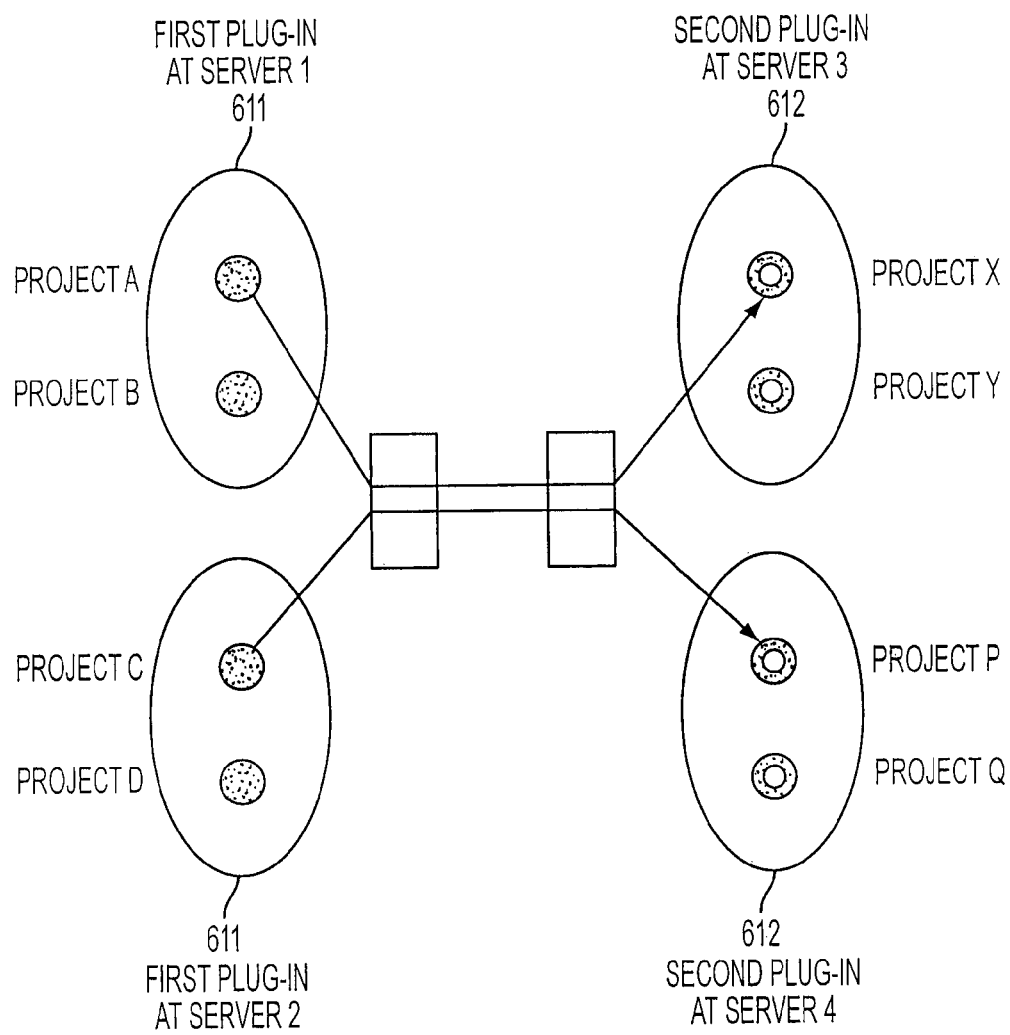

In another example, FIG. 6h may illustrate a similar integration scenario as shown in FIGS. 6f-g. In some implementations, a first Integration Bridge may be used to configure a mapping between Project A of First Plug-in 611, which may reside on a Server 1, and Project X of Second Plug-in 612, which may reside on a Server 3. A second Integration Bridge may be used to configure a mapping between Project C of First Plug-in 611, which may reside on a Server 2, and Project P of Second Plug-in 612, which may reside on a Server 4. Similarly, in some implementations, a Rich Client Platform may support multiple instances of a Plug-in, and a single Integration Bridge may be used to configure mappings between Projects A and C of First Plug-in 611, which reside on Servers 1 and 2, respectively, and Projects X and P of Second Plug-in 612, which reside on Servers 3 and 4, respectively. That is, a single Integration Bridge may be used when a Plug-in simultaneously supports configurations of more than one server.

Implementations of the invention may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, instructions, etc.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it is understood that it is within the knowledge of one skilled in the art to effect such feature, structure, or characteristic in connection with other aspects or implementations whether or not explicitly described. Thus, various changes and modifications may be made, without departing from the scope and spirit of the invention. The specification and drawings are to be regarded as exemplary only, and the scope of the invention is to be determined solely by the appended claims.

What is claimed is:

1. A method providing a server side application integration framework, comprising:
    providing an integration architecture on a machine having an integration bridge that resides on a client platform, wherein the integration bridge integrates a first component external to the client platform with a second component external to the client platform;
    loading, into the integration bridge, a first plug-in that provides a first interface between the first external component and the integration bridge, wherein the first plug-in handles bi-directional communications with the first external component;
    loading, into the integration bridge, a second plug-in that provides a second interface between the second external component and the integration bridge, wherein the second plug-in handles bi-directional communications with the second external component;
    receiving, at a mapping translator coupled to the integration bridge, data directed from the first external component to the second external component via the first plug-in, wherein the first plug-in converts the data directed to the second external component from a first model associated with the first external component into a common object model associated with the integration bridge;
    translating, at the mapping translator, the data directed to the second external component from the common object model associated with the integration bridge into a second model associated with the second external component; and
    relaying the data translated into the second model from the mapping translator to the second plug-in, wherein the second plug-in communicates the relayed data to the second external component.

2. The method of claim 1, wherein the first plug-in includes a first configuration file having translation rules and mapping rules to handle mapping the bi-directional communications with the first external component, and wherein the second plug-in includes a second configuration file having translation rules and mapping rules to handle mapping the bi-directional communications with the second external component.

3. The method of claim 2, further comprising:
    receiving, at a configurator coupled to the integration bridge, the first configuration file from the first plug-in and the second configuration file from the second plug-in; and
    loading, with the configurator, the first configuration file and the second configuration file into the integration bridge to configure a mapping model that the mapping translator uses to translate the data directed from the first external component into the second model associated with the second external component.

4. The method of claim 3, further comprising:
    receiving, at the mapping translator, data directed from the second external component to the first external component via the second plug-in, wherein the second plug-in converts the data directed to the first external component from the second model associated with the second external component into the common object model associated with the integration bridge;
    translating, at the mapping translator, the data directed to the first external component from the common object model associated with the integration bridge into the first model associated with the first external component; and
    relaying the data translated into the first model from the mapping translator to the first plug-in, wherein the first plug-in communicates the relayed data to the first external component.

5. The method of claim 4, further comprising:
receiving, at a configurator coupled to the integration bridge a first configuration file from the first plug-in and a second configuration file from the second plug-in; and
loading, with the configurator, the first configuration file and the second configuration file into the integration bridge to configure a mapping model that the mapping translator uses to translate the data directed from the first external component into the second model associated with the second external component and translate the data directed from the second external component into the first model associated with the first external component.

6. The method of claim 5, further comprising synchronizing the first plug-in and with the second plug-in using a synchronizer coupled to the integration bridge in response to the synchronizer determining that the first plug-in or the second plug-in has an unsynchronized state.

7. The method of claim 6, further comprising:
sending, from a monitor associated with the synchronizer, a first pulse to the first plug-in and a second pulse to the second plug-in; and
analyzing, with the synchronizer, a first response to the first pulse and a second response to the second pulse to determine whether the first plug-in or the second plug-in has the unsynchronized state.

8. The method of claim 7, further comprising:
retrieving, from an action queue, a first action that causes the first plug-in to communicate the relayed data translated into first model to the first external component, wherein a queue manager associated with the integration bridge instructs the first plug-in to process the first action in response to the first plug-in not having the unsynchronized state or moves the first action to an end of the action queue in response to the first plug-in having the unsynchronized state; and
retrieving, from the action queue, a second action that causes the second plug-in to communicate the relayed data translated into second model to the second external component, wherein the queue manager instructs the second plug-in to process the second action in response to the second plug-in not having the unsynchronized state or moves the second action to the end of the action queue in response to the second plug-in having the unsynchronized state.

9. The method of claim 2, wherein the first configuration file describes static aspects in the first model associated with the first external component, and wherein the second configuration file describes static aspects in the second model associated with the second external component.

10. The method of claim 6, wherein the first configuration file includes one or more rules that define whether the first plug-in has the unsynchronized state, and wherein the second configuration file includes one or more rules that define whether the second plug-in has the unsynchronized state.

11. The method of claim 1, further comprising:
receiving, at a configurator coupled to the integration bridge, one or more custom mapping rules associated with the first plug-in and one or more custom mapping rules associated with the second plug-in; and
loading, with the configurator, the one or more custom mapping rules associated with the first plug-in and the one or more custom mapping rules associated with the second plug-in into the integration bridge to configure a mapping model that the mapping translator uses to translate the data directed from the first external component into the second model associated with the second external component.

12. A system for providing a server side application integration framework, comprising:
a machine having an integration bridge that resides on a client platform, wherein the integration bridge integrates a first component external to the client platform with a second component external to the client platform;
a first plug-in configured to provide a first interface between the first external component and the integration bridge and handle bi-directional communications with the first external component;
a second plug-in configured to provide a second interface between the second external component and the integration bridge and handle bi-directional communications with the second external component; and
a mapping translator coupled to the integration bridge and configured to:
receive data directed from the first external component to the second external component via the first plug-in, wherein the first plug-in converts the data directed to the second external component from a first model associated with the first external component into a common object model associated with the integration bridge;
translate the data directed to the second external component from the common object model associated with the integration bridge into a second model associated with the second external component; and
relay the data translated into the second model associated with the second external component to the second plug-in, wherein the second plug-in communicates the relayed data to the second external component.

13. The system of claim 12, wherein the first plug-in includes a first configuration file having translation rules and mapping rules to handle mapping the bi-directional communications with the first external component, and wherein the second plug-in includes a second configuration file having translation rules and mapping rules to handle mapping the bi-directional communications with the second external component.

14. The system of claim 13, further comprising a configurator coupled to the integration bridge and configured to:
receive the first configuration file from the first plug-in and the second configuration file from the second plug-in; and
load the first configuration file and the second configuration file into the integration bridge to configure a mapping model that the mapping translator uses to translate the data directed from the first external component into the second model associated with the second external component.

15. The system of claim 13, wherein the first configuration file describes static aspects in the first model associated with the first external component, and wherein the second configuration file describes static aspects in the second model associated with the second external component.

16. The system of claim 12, wherein the mapping translator is further configured to:
receive data directed from the second external component to the first external component via the second plug-in, wherein the second plug-in converts the data directed to the first external component from the second model associated with the second external component into the common object model associated with the integration bridge;

translate the data directed to the first external component from the common object model associated with the integration bridge into the first model associated with the first external component; and relay the data translated into the first model associated with the first external component to the first plug-in, wherein the first plug-in communicates the relayed data to the first external component.

17. The system of claim 16, further comprising a configurator coupled to the integration bridge and configured to:

receive a first configuration file from the first plug-in and a second configuration file from the second plug-in; and load the first configuration file and the second configuration file into the integration bridge to configure a mapping model that the mapping translator uses to translate the data directed from the first external component into the second model associated with the second external component and translate the data directed from the second external component into the first model associated with the first external component.

18. The system of claim 17, further comprising a synchronizer coupled to the integration bridge and configured to synchronize the first plug-in with the second plug-in in response to determining that the first plug-in or the second plug-in has an unsynchronized state.

19. The system of claim 18, further comprising a monitor configured to send a first pulse to the first plug-in and a second pulse to the second plug-in, wherein the synchronizer analyzes a first response to the first pulse and a second response to the second pulse to determine whether the first plug-in or the second plug-in has the unsynchronized state.

20. The system of claim 19, further comprising a queue manager configured to:

retrieve, from an action queue, a first action that causes the first plug-in to communicate the relayed data translated into first model to the first external component, wherein the queue manager instructs the first plug-in to process the first action in response to the first plug-in not having the unsynchronized state or moves the first action to an end of the action queue in response to the first plug-in having the unsynchronized state; and retrieve, from the action queue, a second action that causes the second plug-in to communicate the relayed data translated into second model to the second external component, wherein the queue manager instructs the second plug-in to process the second action in response to the second plug-in not having the unsynchronized state or moves the second action to the end of the action queue in response to the second plug-in having the unsynchronized state.

21. The system of claim 18, wherein the first configuration file includes one or more rules that define whether the first plug-in has the unsynchronized state, and wherein the second configuration file includes one or more rules that define whether the second plug-in has the unsynchronized state.

22. The system of claim 12, further comprising a configurator coupled to the integration bridge and configured to:

receive one or more custom mapping rules associated with the first plug-in and one or more custom mapping rules associated with the second plug-in; and load the one or more custom mapping rules associated with the first plug-in and the one or more custom mapping rules associated with the second plug-in into the integration bridge to configure a mapping model that the mapping translator uses to translate the data directed from the first external component into the second model associated with the second external component.

23. A non-transitory computer-readable medium containing computer-executable instructions for providing a server side application integration framework, wherein executing the computer-executable instructions on a processor causes the processor to:

provide an integration architecture on a machine having an integration bridge that resides on a client platform, wherein the integration bridge integrates a first component external to the client platform with a second component external to the client platform;

load, into the integration bridge, a first plug-in that provides a first interface between the first external component and the integration bridge, wherein the first plug-in handles bi-directional communications with the first external component;

load, into the integration bridge, a second plug-in that provides a second interface between the second external component and the integration bridge, wherein the second plug-in handles bi-directional communications with the second external component;

receive, at a mapping translator coupled to the integration bridge, data directed from the first external component to the second external component via the first plug-in, wherein the first plug-in converts the data directed to the second external component from a first model associated with the first external component into a common object model associated with the integration bridge;

translate, at the mapping translator, the data directed to the second external component from the common object model associated with the integration bridge into a second model associated with the second external component; and relay the data translated into the second model from the mapping translator to the second plug-in, wherein the second plug-in communicates the relayed data to the second external component.

24. The computer-readable medium of claim 23, wherein the first plug-in includes a first configuration file having translation rules and mapping rules to handle mapping the bi-directional communications with the first external component, and wherein the second plug-in includes a second configuration file having translation rules and mapping rules to handle mapping the bi-directional communications with the second external component.

25. The computer-readable medium of claim 24, wherein executing the computer-executable instructions on the processor further causes the processor to:

receive, at a configurator coupled to the integration bridge, the first configuration file from the first plug-in and the second configuration file from the second plug-in; and load, with the configurator, the first configuration file and the second configuration file into the integration bridge to configure a mapping model that the mapping translator uses to translate the data directed from the first external component into the second model associated with the second external component.

26. The computer-readable medium of claim 24, wherein the first configuration file describes static aspects in the first model associated with the first external component, and wherein the second configuration file describes static aspects in the second model associated with the second external component.

27. The computer-readable medium of claim 23, wherein executing the computer-executable instructions on the processor further causes the processor to:
- receive, at the mapping translator, data directed from the second external component to the first external component via the second plug-in, wherein the second plug-in converts the data directed to the first external component from the second model associated with the second external component into the common object model associated with the integration bridge;
- translate, at the mapping translator, the data directed to the first external component from the common object model associated with the integration bridge into the first model associated with the first external component; and
- relay the data translated into the first model from the mapping translator to the first plug-in, wherein the first plug-in communicates the relayed data to the first external component.

28. The computer-readable medium of claim 27, wherein executing the computer-executable instructions on the processor further causes the processor to:
- receive, at a configurator coupled to the integration bridge a first configuration file from the first plug-in and a second configuration file from the second plug-in; and
- load, with the configurator, the first configuration file and the second configuration file into the integration bridge to configure a mapping model that the mapping translator uses to translate the data directed from the first external component into the second model associated with the second external component and translate the data directed from the second external component into the first model associated with the first external component.

29. The computer-readable medium of claim 28, wherein executing the computer-executable instructions on the processor further causes the processor to synchronize the first plug-in and with the second plug-in using a synchronizer coupled to the integration bridge in response to the synchronizer determining that the first plug-in or the second plug-in has an unsynchronized state.

30. The computer-readable medium of claim 29, wherein executing the computer-executable instructions on the processor further causes the processor to:
- send, from a monitor associated with the synchronizer, a first pulse to the first plug-in and a second pulse to the second plug-in; and
- analyze, with the synchronizer, a first response to the first pulse and a second response to the second pulse to determine whether the first plug-in or the second plug-in has the unsynchronized state.

31. The computer-readable medium of claim 30, wherein executing the computer-executable instructions on the processor further causes the processor to:
- retrieve, from an action queue, a first action that causes the first plug-in to communicate the relayed data translated into first model to the first external component, wherein a queue manager associated with the integration bridge instructs the first plug-in to process the first action in response to the first plug-in not having the unsynchronized state or moves the first action to an end of the action queue in response to the first plug-in having the unsynchronized state; and
- retrieve, from the action queue, a second action that causes the second plug-in to communicate the relayed data translated into second model to the second external component, wherein the queue manager instructs the second plug-in to process the second action in response to the second plug-in not having the unsynchronized state or moves the second action to the end of the action queue in response to the second plug-in having the unsynchronized state.

32. The computer-readable medium of claim 29, wherein the first configuration file includes one or more rules that define whether the first plug-in has the unsynchronized state, and wherein the second configuration file includes one or more rules that define whether the second plug-in has the unsynchronized state.

33. The computer-readable medium of claim 23, wherein executing the computer-executable instructions on the processor further causes the processor to:
- receive, at a configurator coupled to the integration bridge, one or more custom mapping rules associated with the first plug-in and one or more custom mapping rules associated with the second plug-in; and
- load, with the configurator, the one or more custom mapping rules associated with the first plug-in and the one or more custom mapping rules associated with the second plug-in into the integration bridge to configure a mapping model that the mapping translator uses to translate the data directed from the first external component into the second model associated with the second external component.

* * * * *